United States Patent
Reh et al.

[19]

[11] Patent Number: 5,961,103
[45] Date of Patent: Oct. 5, 1999

[54] HYDRAULIC ANTIVIBRATION SUPPORT

[75] Inventors: Denis Reh, Thiville; Jean-Pierre Monneau, Saint Hilaire S/Yerre, both of France

[73] Assignee: Hutchinson, Paris, France

[21] Appl. No.: 09/122,979

[22] Filed: Jul. 27, 1998

[30] Foreign Application Priority Data

Aug. 1, 1997 [FR] France .................................. 97 09877

[51] Int. Cl.⁶ ....................................................... F16F 9/00
[52] U.S. Cl. ................................ 267/140.13; 267/140.12; 267/219
[58] Field of Search ........................ 267/140.11, 140.12, 267/140.13, 140.14, 219, 220, 292, 293, 140.5, 140.4, 140.3, 140.2; 180/300, 312, 902; 248/636, 638, 562, 634

[56] References Cited

U.S. PATENT DOCUMENTS

| | | | |
|---|---|---|---|
| 5,549,283 | 8/1996 | Bellamy et al. | 267/140.12 |
| 5,556,071 | 9/1996 | Bellamy et al. | 248/634 |
| 5,741,001 | 4/1998 | Bellamy et al. | 248/634 |
| 5,855,364 | 1/1999 | Reh et al. | 267/140.13 |

FOREIGN PATENT DOCUMENTS

| 0 646 735 A1 | 4/1995 | European Pat. Off. . |
|---|---|---|
| 0 709 594 A1 | 5/1996 | European Pat. Off. . |

OTHER PUBLICATIONS

French Preliminary Search Report dated May 13, 1998, French Application FR 9709877.

*Primary Examiner*—Douglas C. Butler
*Attorney, Agent, or Firm*—Marshall, O'Toole, Gertsein, Murray & Borun

[57] ABSTRACT

A hydraulic antivibration support comprises a strength member connected to a plate by an elastomer body whose base is pressed against the plate to define two hydraulic chambers and a narrow channel all filled with liquid. A perforated sheet metal insert embedded in the base of the elastomer body is crimped to the plate via two fixing edges that are interconnected by two free edges of the base. The perforated insert has a stamped corrugation which defines the narrow channel and whose outer side wall extends around the entire periphery of the plate.

11 Claims, 4 Drawing Sheets

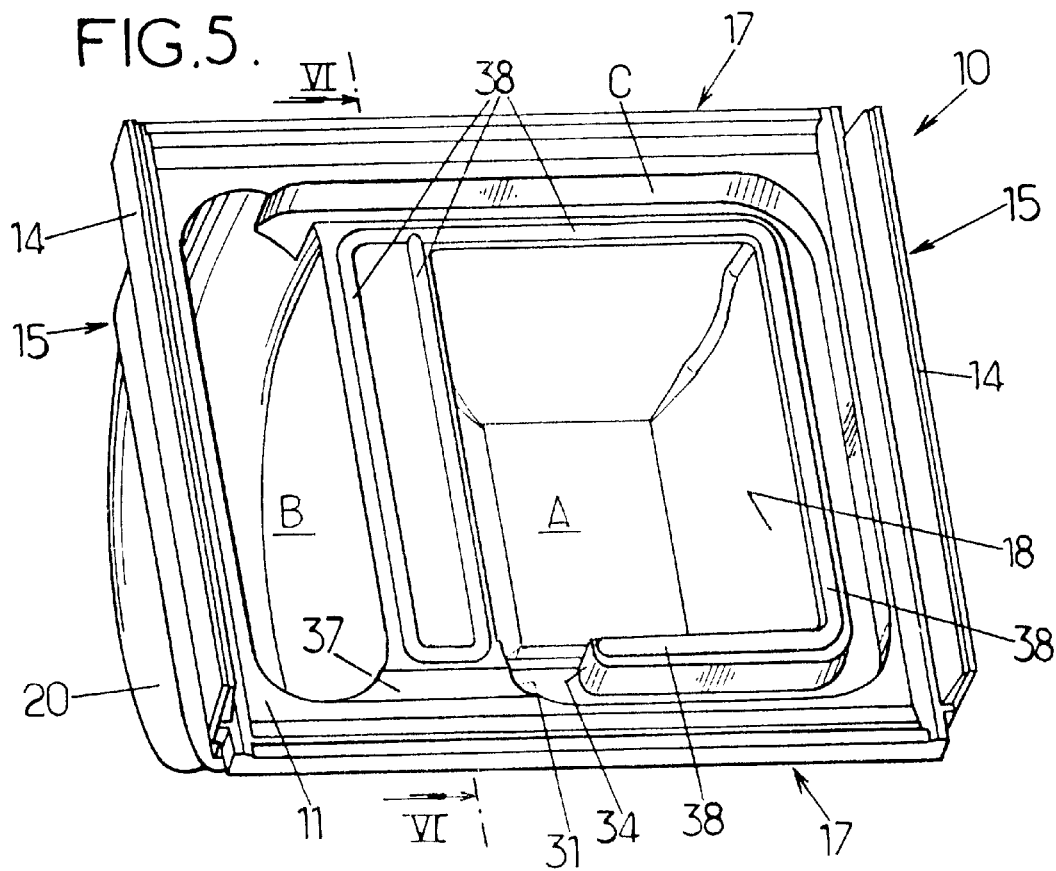
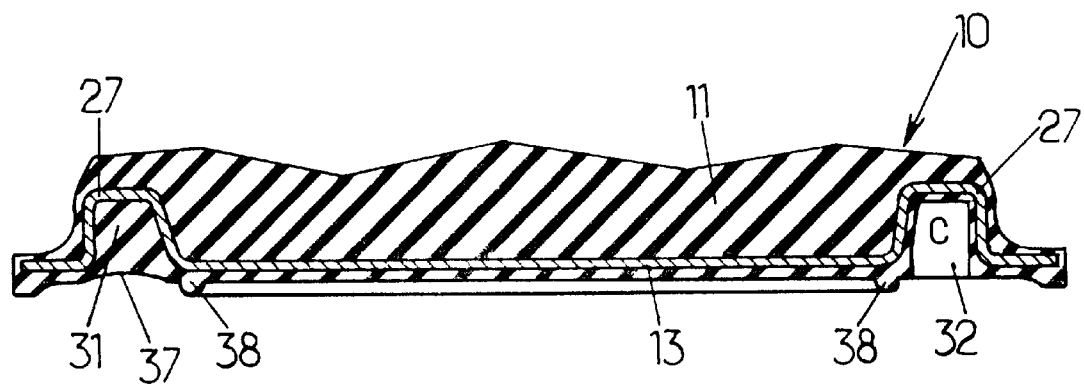

HYDRAULIC ANTIVIBRATION SUPPORT

FIELD OF THE INVENTION

The present invention relates to hydraulic antivibration supports.

More particularly, the invention relates to a hydraulic antivibration support designed to be interposed between two rigid elements to damp vibration between said two elements essentially along a first axis, the support comprising:

first and second rigid strength members suitable for securing respectively to the two rigid elements to be united, the second strength being constituted by a plate which extends perpendicularly to the first axis and which has a "support" face facing towards the first strength member;

an elastomer body in the form of a one-piece molding connecting the first strength member to the plate and having a base pressed in sealing contact against the support face of the plate merely by clamping parallel to the first axis, the elastomer body further including a thick bell-shaped wall extending along the first axis and flaring to the base of said elastomer body from a top secured to the first strength member;

a liquid-filled working chamber defined by the thick wall of the elastomer body and by the support plate of the plate;

a liquid-filled compensation chamber defined by a freely-deformable thin wall belonging to the elastomer body and by the support face of the plate;

a liquid-filled narrow channel interconnecting the first and second liquid-filled chambers and which is formed between the base of the elastomer body and the support face of the plate; and a rigid perforated insert embedded in the base of the elastomer body and secured to the plate by crimping to press the base of the elastomer body in sealing contact against the support face of the plate, said perforated insert presenting, on a portion of its periphery, a corrugation projecting away from the plate and open towards the support face of said plate, said corrugation co-operating with the support face of the plate to define the narrow channel, and said corrugation having a radially inner side wall, a radially outer side wall, and a web interconnecting the inner and outer side walls.

BACKGROUND OF THE INVENTION

Document EP-A-0 646 735 describes an example of a hydraulic antivibration support of the type specified above.

OBJECTS AND SUMMARY OF THE INVENTION

A particular object of the present invention is to improve that known antivibration support by improving its sealing.

To this end, according to the invention, in a hydraulic antivibration support of the kind in question the outer side wall of the corrugation extends continuously around the entire periphery of the perforated insert.

By means of these dispositions, the stiffness of the perforated insert is considerably increased, such that said insert presses the base of the elastomer body more strongly and more reliably against the support face of the plate, and at all points on said base.

In addition, increasing the stiffness of the perforated insert makes it less fragile and reduces the risk of said perforated insert being accidentally deformed during the process of manufacturing the antivibration support, thereby reducing the risk of the antivibration support leaking.

In preferred embodiments of the invention, use may optionally be made of one or more of the following dispositions:

the working and compensation chambers, one of which constitutes a first chamber and the other a second chamber, are juxtaposed in non-concentric manner on the plate, the corrugation partially surrounding the first chamber and extending between first and second ends which are adjacent to the second chamber, the first end being closed by the elastomer body, the narrow channel communicating with the first chamber in the vicinity of said first end, and the second end communicating with the second chamber;

the base of the elastomer body has a hollow at the first end of the corrugation, which hollow co-operates with the support face of the plate to define a leakage passage putting the narrow channel into communication with the second chamber and short-circuiting at least a portion of said narrow channel, the leakage passage having a first section and the narrow channel having a second section, said second section being greater than ten times the first section;

the inner side wall of the corrugation is a peripheral wall completely surrounding the first chamber and forming a rigid spacer between the first and second chambers;

the perforated insert and the base of the elastomer body form a hollow in the spacer of said perforated insert, which hollow co-operates with the support face of the plate to define a leakage passage putting the first chamber into communication with the second chamber and short-circuiting the narrow channel, the leakage passage having a first section and the narrow channel having a second section, said second section being greater than ten times the first section;

the first chamber is the working chamber and the second chamber is the compensation chamber;

the perforated insert further includes first and second cutouts, one corresponding to the working chamber and the other to the compensation chamber;

the perforated insert is made of cut and stamped sheet metal, the corrugation being constituted by stamping said perforated insert;

at its periphery, the base of the elastomer body has firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate;

the antivibration support further includes a rigid cover covering the thick wall of the elastomer body, at least in part, thereby limiting displacement of the first strength member relative to the plate, said cap having fixing zones extending parallel to the plate and secured to said plate in the vicinity of the free edges of the base of the elastomer body, said free edges of the perforated insert and of the base of the elastomer body being clamped together along the first axis between the support face of the plate and said cap; and the base of the elastomer body has two fixing edges interconnected by two free edges, the cap being generally Ω-shaped, being open along a second axis perpendicular to said first axis, with two fixing flanges forming said fixing zones, and the first strength member is in the form of an elongate rigid member extending longitudinally along said second axis.

BRIEF DESCRIPTION OF THE DRAWINGS

Other characteristics and advantages of the invention appear from the following description of various embodiments, given as non-limiting examples and with reference to the accompanying drawings.

In the drawings:

FIG. 5 is a perspective view from beneath of the elastomer body belonging to the antivibration support in a first variant of the invention;

FIG. 6 is a section view on line VI—VI of FIG. 5; and

MORE DETAILED DESCRIPTION

In the various figures, the same references designate elements that are identical or similar.

Figure 2:
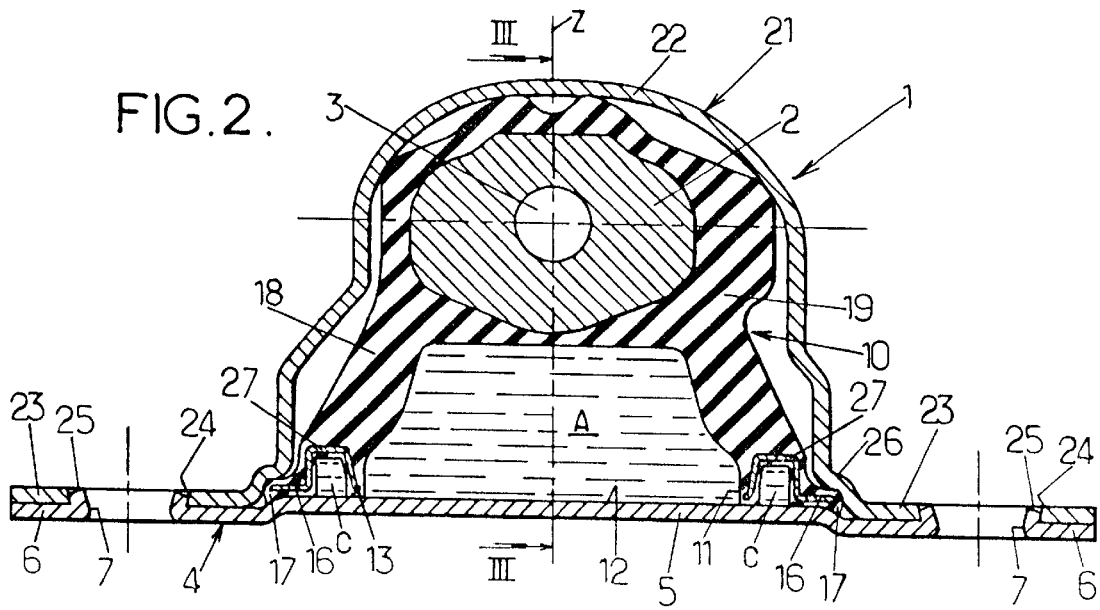
FIG. 2 is a section view on line II—II of FIG. 1.
Figure 1:
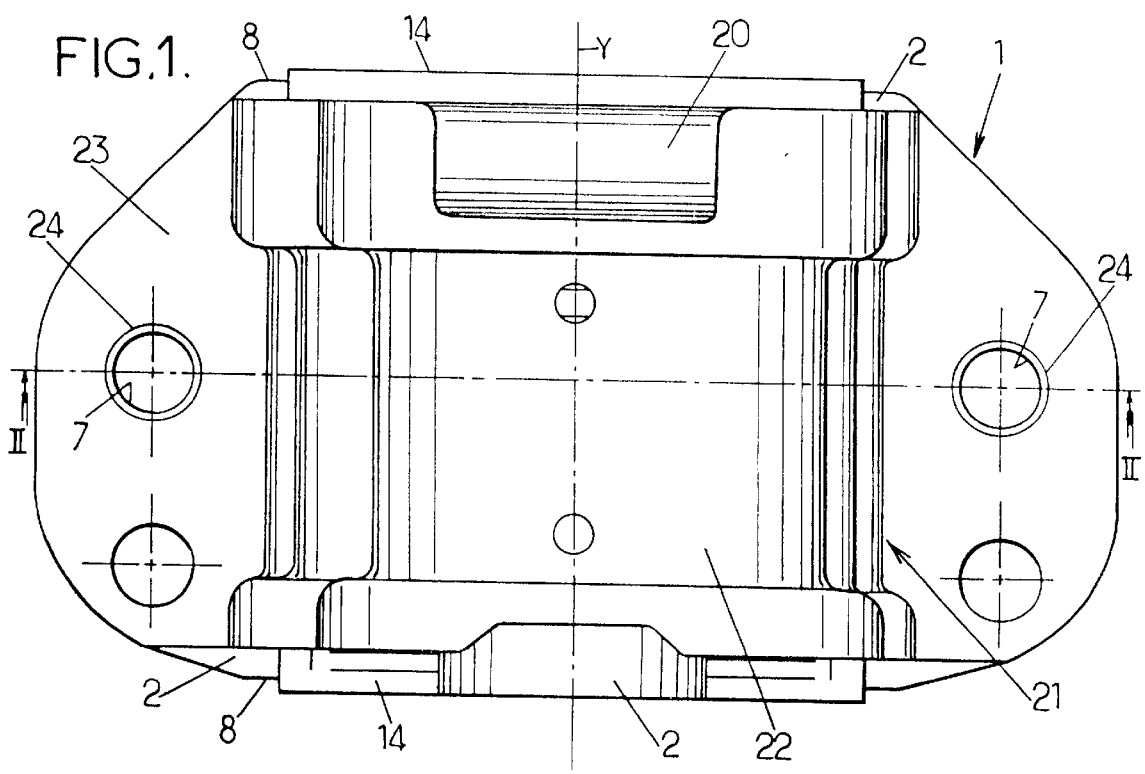
FIG. 1 is a plan view of a hydraulic antivibration support constituting an embodiment of the invention.
Figure 3:
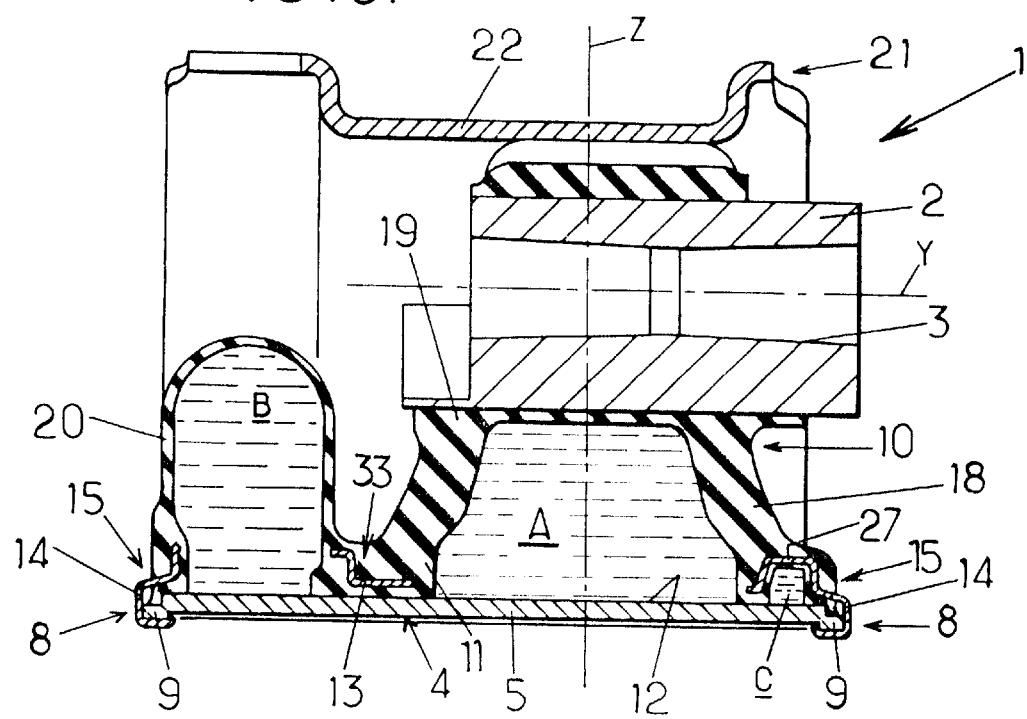
FIG. 3 is a section view on line III—III of FIG. 2.

The hydraulic antivibration support 1 shown in FIGS. 1 to 3 is designed to be interposed between two rigid elements such as the structure and the power unit of a vehicle, for the purpose of supporting the power unit and of damping and filtering vibration between those two elements, essentially along a vertical axis Z.

The antivibration support comprises firstly a first rigid strength member 2 in the form of an elongate metal member extending along an axis Y perpendicular to the axis Z and pierced by a central hole 3 enabling it to be fixed to the power unit of the vehicle, for example.

This first strength member 2 is disposed above a second rigid strength member 4 in the form of a metal plate that is substantially plane in general shape, extending perpendicularly to the axis Z, i.e. horizontally.

The plate 4 has a stamped central portion 5 that is plane in shape, and that is slightly raised relative to two fixing flanges 6 at opposite ends of said central portion.

Each of the flanges 6 is provided with at least one fixing hole 7 designed to fix the plate 4 to the structure of the vehicle.

Naturally, the plate 4 could be fixed to the power unit and the strength member 2 to the structure, in which case the strength member 2 would be situated beneath the plate 4, and the overall disposition of the antivibration support would then be upside-down relative to the disposition shown in the drawings.

In addition, the plate 4 has two lateral edges 8 each extending between the two fixing flanges 6 and forming respective rims or margins 9 that are offset downwards relative to the central portion 5.

Also, the plate 4 is connected to the strength member 2 by an elastomer body 10 which is molded as a single piece and which has a base 11 pressed in sealed manner against the support or top face 12 of the plate 4, merely by axial clamping parallel to the axis Z.

This axial clamping is obtained by crimping a perforated and stamped rigid metal insert 13 which is generally made of steel and which is embedded in the base 11 of the elastomer body.

More particularly, the perforated insert 13 has two side tabs 14 which project outwards from two opposite edges 15 of the base of the elastomer body, which extend along the length of the rims 9, and which are crimped to said rims 9.

In addition, the tabs 14 of the perforated insert 13 are connected to each other by two opposite edges 16 of said insert, which edges together with the tabs 14 form the periphery of the perforated insert, with each edge constituting a plane margin parallel to the plane of the plate 4.

These two free edges 16 are embedded in the base 11 of the elastomer body, thereby likewise forming two free edges 17 corresponding to the edges 16, said free edges 16, 17 being merely pressed axially against the top face 12 of the plate, without crimping.

The elastomer body 10 also has a bell-shaped thick wall 18 having sufficient compression strength to support the power unit. This wall 18 flares downwards from a top 19 bonded to the strength member 2 to the base 11 of the elastomer body, co-operating with the top face 12 of the plate to define a working chamber A which is filled with liquid.

In addition, the elastomer body 10 also forms a flexible membrane 20 that is likewise bell-shaped, that is freely deformable, and that co-operates with the top face 12 of the plate to define a compensation chamber B which is also filled with liquid.

The two chambers A and B are thus juxtaposed in non-concentric manner on the top face 12 of the plate, and these two chambers may, for example, be substantially in alignment on the axis Y.

Furthermore, the two chambers A and B communicate with each other via a narrow channel C which is defined between the top face 12 of the plate and a groove formed in the base 11 of the elastomer body, the shape of the groove being preferably defined by stamping the perforated insert 13.

The narrow channel C thus enables liquid to be transferred between the chambers A and B for the purpose of damping vibration between the strength member 2 and the plate 4, essentially along the axis Z.

Finally, to limit displacement of the strength member 2 relative to the plate 4, the antivibration support also includes a rigid metal cover 21 which is a section member of substantially Ω-shaped section having two open axial faces extending perpendicularly to the axis Y.

The cover 21 has a central portion 22 capable of co-operating with projections on the elastomer body by coming into abutment therewith, and it extends between two horizontal flanges 23 which rest on the fixing flanges 6 of the plate.

These flanges 23 have respective fixing holes 24 in register with the fixing holes 7 of the flanges 6 so that the plate 4 and the cover 21 can be fixed together by being screwed to the structure of the vehicle.

In addition, the flanges 23 and 6 are advantageously also fixed to each other by crimping.

By way of example, the crimping can be performed by flaring portions 25 of the plate 4 through the holes 24 in the flanges of the cover, in which case the holes are frustoconically shaped, flaring upwards.

Finally, between the central portion 22 and each of the flanges 23, the cover also has a step 26 forming a bearing zone which is pressed parallel to the axis Z against the free edges 16, 17 of the perforated insert and the base of the elastomer body, thus pressing the free edges against the top face 12 of the plate.

This guarantees a determined clamping force holding the free edges 16, 17 against the plate 4, preventing any leakage of liquid between said plate and the base of the elastomer body via said free edges 16, 17.

Figure 4:
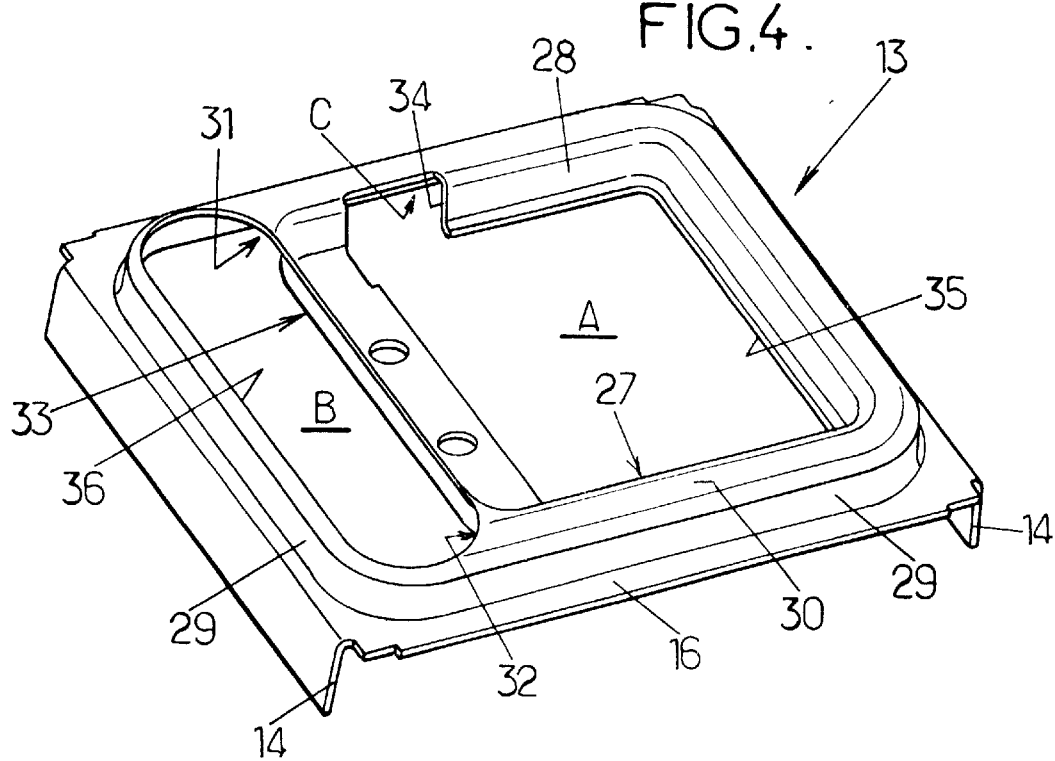
FIG. 4 is a perspective view of the perforated insert belonging to the antivibration support of FIGS. 1 to 3.

In addition, given that the sealing of the antivibration support depends in part on the stiffness of the perforated sheet metal insert 13 perpendicularly to its plane, this stiffness is increased by extending over the entire periphery of said insert the stamping which defines the narrow channel 13 so as to form a peripheral reinforcing rib, as can be seen in FIG. 4.

More particularly, the stamping which defines the narrow channel C forms a corrugation 27 projecting away from the plate 4, which corrugation is open towards the support face 12 of said plate.

The corrugation 27 has a radially inner side wall 28, a radially outer side wall 29, and a web 30 interconnecting the inner and outer side walls.

The corrugation 27 extends over three sides around the working chamber A between two ends 31 and 32 which are adjacent to the compensation chamber B. Naturally, the corrugation 27 could extend around the compensation chamber B instead of around the working chamber A.

In addition, the outer side wall 29 is extended beyond said ends 31 and 32 of the corrugation by passing outside the compensation chamber B, thereby forming the above-mentioned continuous peripheral rib.

In addition, the stiffness of the perforated insert 13 is further increased by the fact that the inner side wall 28 is extended inwards beyond the ends 31 and 32 of the corrugation so as to form a peripheral wall which completely surrounds the working chamber A, constituting a rigid spacer 33 between the first and second chambers.

In the example under consideration, said side wall 28 nevertheless includes an opening 34 in the vicinity of the end 31 of the corrugation, which opening 34 enables the narrow channel C to communicate with the working chamber A (where appropriate, the opening 34 could be replaced, in particular by a stamping formed in the plate 4).

This opening 34 does not communicate directly with the compensation chamber B insofar as the first end 31 of the corrugation 27 is closed by elastomer when the elastomer body 10 is molded, the end 32 of the corrugation remaining clear so as to cause the narrow channel C to communicate with the compensation chamber B.

Finally, the perforated insert 13 has two cutouts 35 and 36 formed respectively in register with the working chamber A and with the compensation chamber B so as to enable said chambers to be molded.

Two variants of the hydraulic antivibration support of FIGS. 1 to 4 are described below. In these two variants, the antivibration support is similar to that of FIGS. 1 to 4 and is therefore not described again in detail.

In a first variant, as shown in FIGS. 5 and 6, the first end 31 of the corrugation 27 can be only partially closed by the elastomer body, with the bottom face of the base 11 thus leaving a hollow 37 in the form of a groove which co-operates with the support face 12 of the plate to provide a leakage passage causing the narrow channel C to communicate with the compensation chamber B by short-circuiting said narrow channel.

The calibrated leak created by the above-mentioned leakage passage between the chambers A and B has a positive effect on the operation of the antivibration support insofar as said calibrated leak provides effective damping of vibration over a wider frequency range.

The leakage passage does not prevent the narrow channel C from operating insofar as once the antivibration support has been assembled the leakage passage is of very small flow section with the narrow channel C generally having a section that is much greater than that of the leakage passage, e.g. more than ten times the section of the leakage passage.

In the example shown in FIGS. 5 and 6, the base 11 of the elastomer body has sealing lips 38 on its bottom face, in particular between the working chamber A and the compensation chamber B, these sealing lips 38 being interrupted at the hollow 37.

Figure 7:
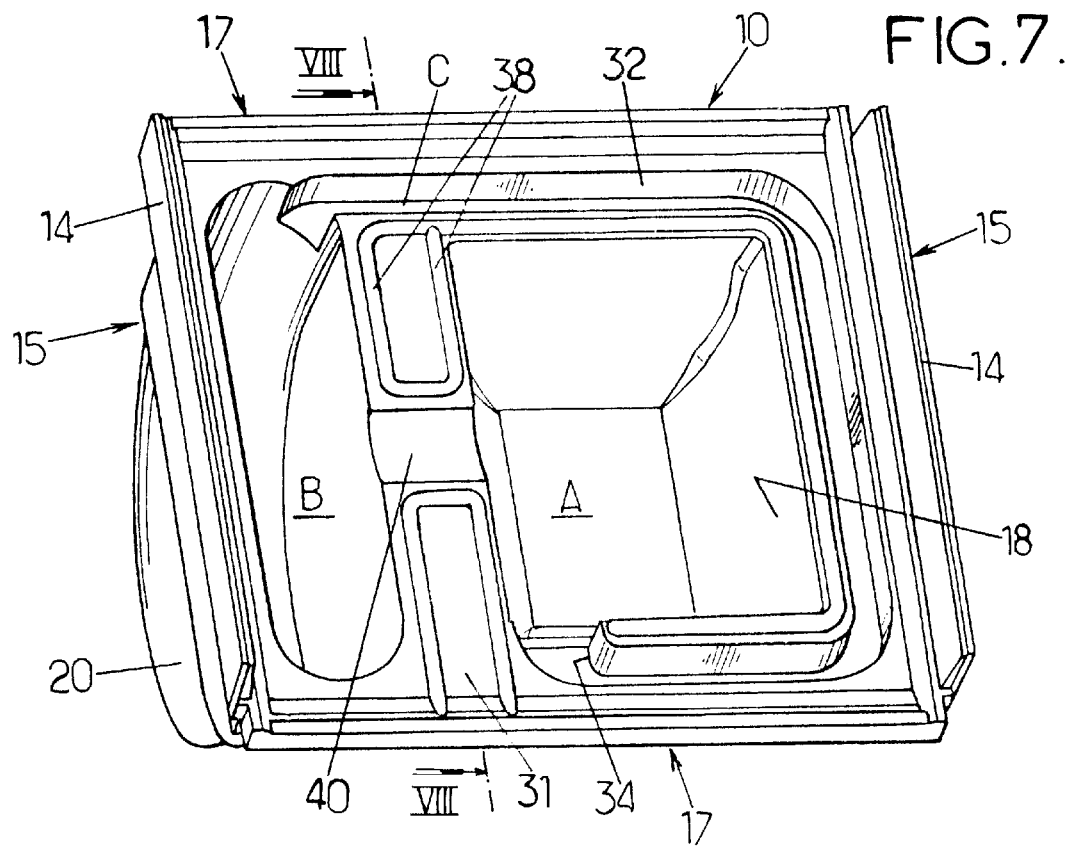
FIGS. 7 and 8 are views similar to FIGS. 5 and 6, showing a second variant of the invention.
Figure 8:
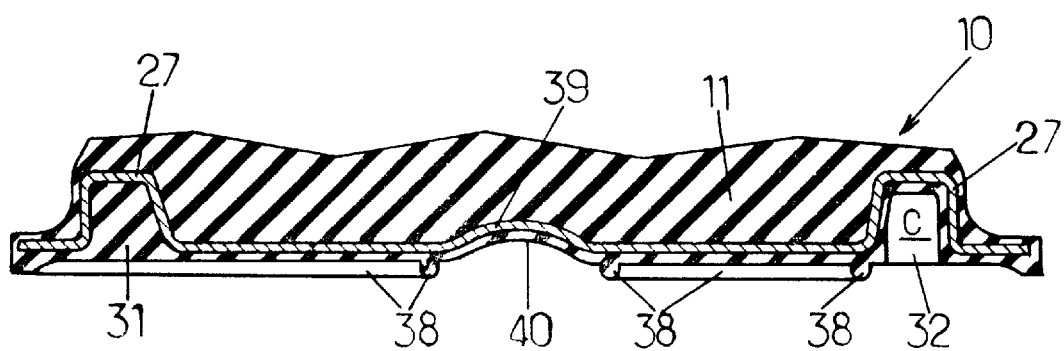

In a second variant of the invention, shown in FIGS. 7 and 8, advantage is taken of the stiffness provided by the spacer 33 to define accurately a leakage passage through the spacer 33 rather than at the end 31 of the corrugation 27.

In this variant, the perforated insert 13 has a small dent 39 across the spacer 33, said dent 39 co-operating with the bottom face of the base 11 of the elastomer body to form a groove 40 directly connecting the working chamber A to the compensation chamber B.

As in the variant of FIGS. 5 and 6, the sealing lips 38 are interrupted, this time at the groove 40, and said groove has dimensional characteristics similar to those described above with reference to FIGS. 5 and 6.

We claim:

1. A hydraulic antivibration support designed to be interposed between two rigid elements to damp vibration between said two elements essentially along a first axis, the support comprising:

first and second rigid strength members suitable for securing respectively to the two rigid elements to be united, the second strength being constituted by a plate which extends perpendicularly to the first axis and which has a support face facing towards the first strength member;

an elastomer body in the form of a one-piece molding connecting the first strength member to the plate and having a base pressed in sealing contact against the support face of the plate merely by clamping parallel to the first axis, the elastomer body further including a thick bell-shaped wall extending along the first axis and flaring to the base of said elastomer body from a top secured to the first strength member;

a liquid-filled working chamber defined by the thick wall of the elastomer body and by the support plate of the plate;

a liquid-filled compensation chamber defined by a freely-deformable thin wall belonging to the elastomer body and by the support face of the plate;

a liquid-filled narrow channel interconnecting the first and second liquid-filled chambers and which is formed between the base of the elastomer body and the support face of the plate; and a rigid perforated insert embedded in the base of the elastomer body and secured to the plate by crimping to press the base of the elastomer body in sealing contact against the support face of the plate, said perforated insert presenting, on a portion of its periphery, a corrugation projecting away from the plate and open towards the support face of said plate, said corrugation co-operating with the support face of the plate to define the narrow channel, and said corrugation having a radially inner side wall, a radially outer side wall, and a web interconnecting the inner and outer side walls;

wherein the outer side wall of the corrugation extends continuously around the entire periphery of the perforated insert.

2. A hydraulic antivibration support according to claim 1, in which the working and compensation chambers, one of which constitutes a first chamber and the other a second chamber, are juxtaposed in non-concentric manner on the plate, the corrugation partially surrounding the first chamber and extending between first and second ends which are adjacent to the second chamber, the first end being closed by the elastomer body, the narrow channel communicating with the first chamber in the vicinity of said first end, and the second end communicating with the second chamber.

3. A hydraulic antivibration support according to claim 2, in which the base of the elastomer body has a hollow at the first end of the corrugation, which hollow co-operates with the support face of the plate to define a leakage passage putting the narrow channel into communication with the second chamber and short-circuiting at least a portion of said narrow channel, the leakage passage having a first section and the narrow channel having a second section, said second section being greater than ten times the first section.

4. A hydraulic antivibration support according to claim 2, in which the inner side wall of the corrugation is a peripheral wall completely surrounding the first chamber and forming a rigid spacer between the first and second chambers.

5. A hydraulic antivibration support according to claim 4, in which the perforated insert and the base of the elastomer body form a hollow in the spacer of said perforated insert, which hollow co-operates with the support face of the plate to define a leakage passage putting the first chamber into communication with the second chamber and short-circuiting the narrow channel, the leakage passage having a first section and the narrow channel having a second section, said second section being greater than ten times the first section.

6. A hydraulic antivibration support according to claim 2, in which the first chamber is the working chamber and the second chamber is the compensation chamber.

7. A hydraulic antivibration support according to claim 1, in which the perforated insert further includes first and second cutouts, one corresponding to the working chamber and the other to the compensation chamber.

8. A hydraulic antivibration support according to claim 1, in which the perforated insert is made of cut and stamped sheet metal, the corrugation being constituted by stamping said perforated insert.

9. A hydraulic antivibration support according to claim 1, in which, at its periphery the base of the elastomer body has firstly at least two opposite "fixing" edges along which said crimping is performed, and secondly at least two free edges interconnecting the fixing edges, the perforated insert itself having free edges which are embedded in the free edges of the base of the elastomer body and which are merely pressed axially against the support face of the plate.

10. A hydraulic antivibration support according to claim 9, further including a rigid cover covering the thick wall of the elastomer body, at least in part, thereby limiting displacement of the first strength member relative to the plate, said cap having fixing zones extending parallel to the plate and secured to said plate in the vicinity of the free edges of the base of the elastomer body, said free edges of the perforated insert and of the base of the elastomer body being clamped together along the first axis between the support face of the plate and said cap.

11. A hydraulic antivibration support according to claim 10, in which the base of the elastomer body has two fixing edges interconnected by two free edges, the cap being generally Ω-shaped, being open along a second axis perpendicular to said first axis, with two fixing flanges forming said fixing zones, and the first strength member is in the form of an elongate rigid member extending longitudinally along said second axis.

* * * * *